G. E. JONSSON.
MILKING MACHINE.
APPLICATION FILED OCT. 7, 1909.
965,193.
Patented July 26, 1910.
3 SHEETS—SHEET 3.
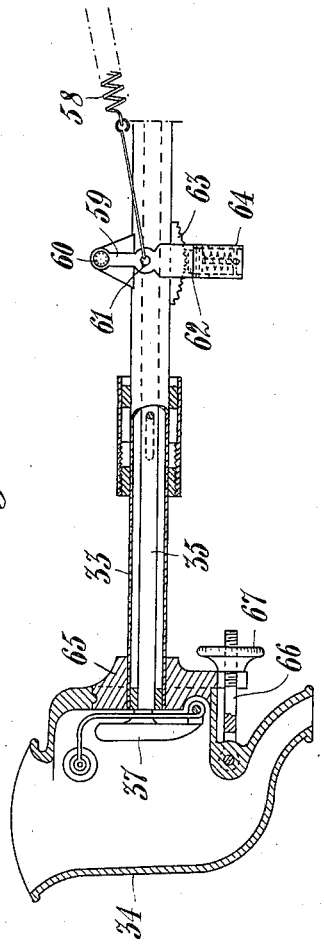
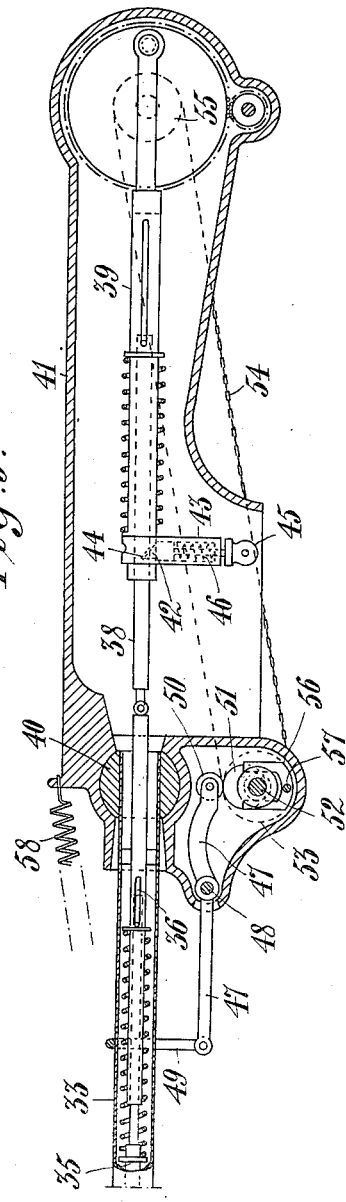
Witnesses
Inventor
Gustof E. Jonsson

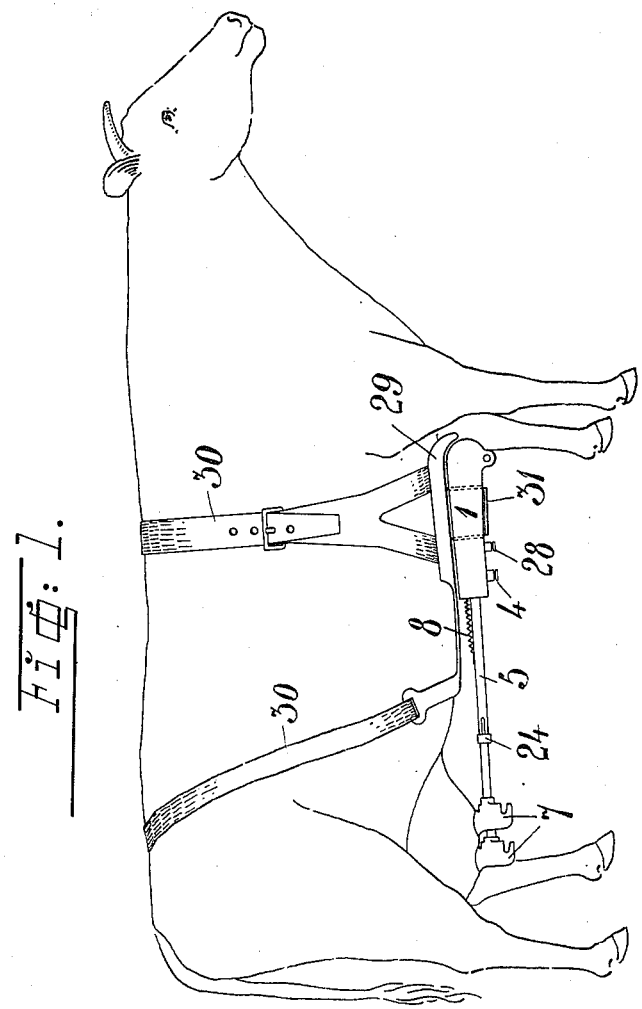

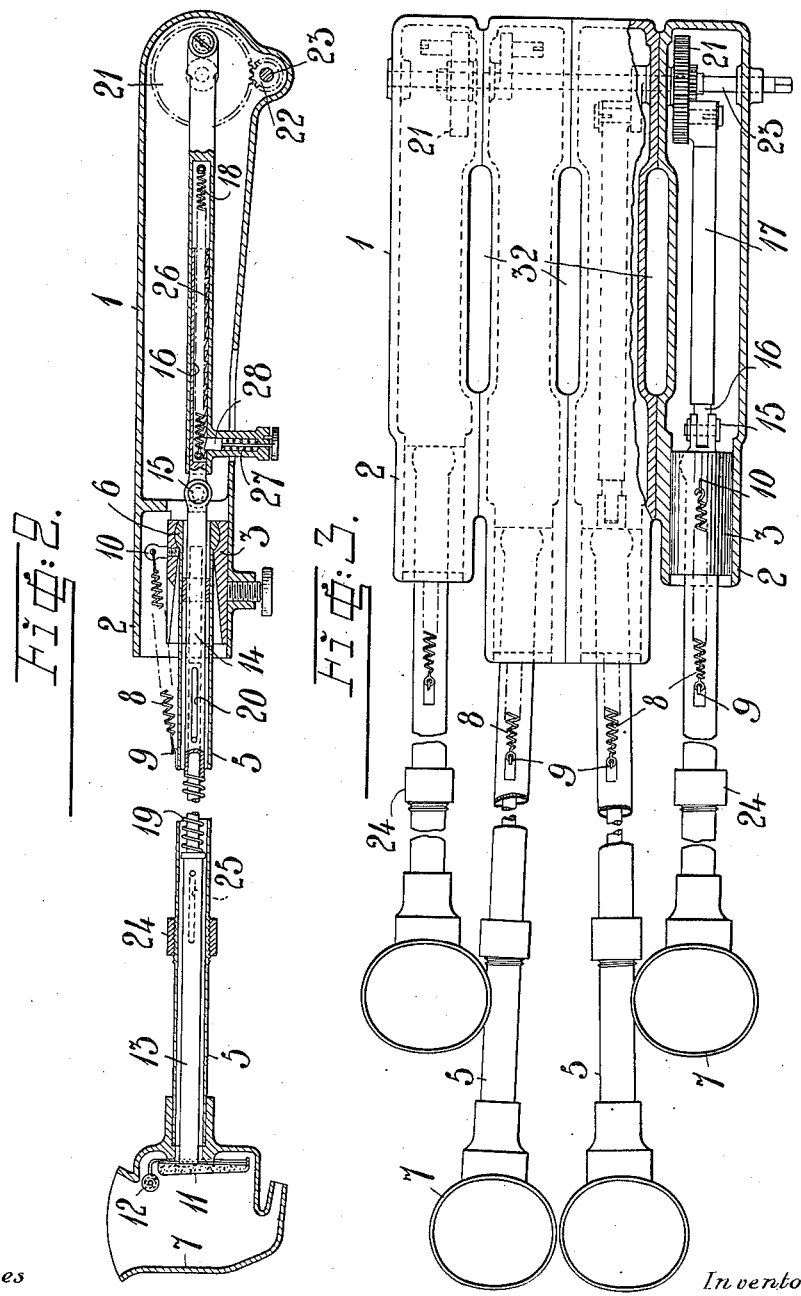

UNITED STATES PATENT OFFICE.

GUSTAF EMIL JONSSON, OF HERRLJUNGA, SWEDEN.

MILKING-MACHINE.

965,193.  Specification of Letters Patent.  Patented July 26, 1910.

Application filed October 7, 1909. Serial No. 521,628.

*To all whom it may concern:*

Be it known that I, GUSTAF EMIL JONSSON, a subject of the King of Sweden, residing at Herrljunga, in the Kingdom of Sweden, have invented new and useful Improvements in Milking-Machines, of which the following is a specification, reference being had to the drawings accompanying and forming a part hereof.

This invention relates to milking machines.

Milking machines hitherto constructed have been adapted to be hung, during working, under or near the udder of the cow. It is obvious that in such case the machine must be yielding, since it would otherwise be impossible to use the machine on different animals, as the form and size of the udder varies in animals. The yielding suspension has, however, a serious drawback in that the machine is liable to be displaced relatively to the udder even by small movements of the cow, due to the comparatively heavy machine being impeded by inertia so as not to be able to quickly respond to the movements of the cow. Such a milking machine is, therefore, liable to lose its grip on the teats and the milking operation in such a case cannot be continued until the machine has been readjusted.

The object of the present invention is to avoid this drawback and to provide a milking machine which under all circumstances operates quite satisfactorily.

The invention consists, chiefly, in that the heavier portion of the machine, *i. e.* the box, frame or the like containing or holding the driving members and mechanism, is attached to the cow at a comparatively great distance from the udder, preferably just behind the forelegs of the cow. By this means it is made possible to rigidly attach the said part of the machine to the cow so that it cannot be displaced by quick movements of the cow. The teat cups are suitably carried by long arms or the like pivotally connected to the part of the machine rigidly attached to the cow, said arms being actuated by springs or the like tending to keep the teat cups yieldingly pressed against the udder so as to respond to the movements of the animal.

The invention further comprises the construction and combination of parts hereinafter more particularly described.

In the drawings, Figure 1 shows in what manner the milking machine is applied to the cow. Fig. 2 is a vertical longitudinal section of one embodiment of the machine. Fig. 3 is a plan view and partial section of the same machine. Figs. 4 and 5 are vertical longitudinal sections of the second embodiment of the machine, Fig. 4 showing the rear part and Fig. 5 the fore part of the said machine.

Referring to Figs. 1-3 of the drawings, the driving parts of the milking machine are inclosed in a box 1 made of some light and strong material, such as an alloy of aluminium. The rear part of the box (in Figs. 2 and 3 the left part thereof) forms four cylinders 2. Placed in the said cylinders are slides 3 adapted to be locked in position by set screws 4. Journaled in each slide, preferably by a ball-joint 6, is an arm 5 which is thus adapted to swing at a small angle in all directions. The arms 5 are made of tubes and are of such a length that the teat cups 7 attached to their free ends are just beneath the udder when the box is placed immediately behind the forelegs of the cow. The teat cups are kept pressed against the udder by spiral springs 8, one for each arm 5. Each spring is attached at one end to a hook 9 on the corresponding arm, while the opposite end of the spring is attached to a lug 10 projecting upwardly from the corresponding slide. If desired, the springs may be provided with a tension-regulating device so that the pressure of the teat cups against the udder can be varied at will.

The milking organ of each teat cup consists of a plate 11 and a roller 12 elastically attached thereto. In operating the teat the roller 12 first presses against the teat and cuts off the interior thereof from the udder, whereupon the plate 11 presses out the milk from the teat. The plate is attached to a rod 13 movable longitudinally within the hollow arm 5 and inserted into a hollow rod 14 connected by a joint 15 to a connecting-rod. Each connecting-rod consists of two slidably connected parts 16 and 17 kept together by a spring 18. Placed around the rod 13 is another spiral spring 19 acting to move the rods 13 and 14 apart, said movement being, however, prevented by a pin attached to the rod 13 and projecting into a slot 20 in the rod 14. The connecting-rods 17 are suitably driven by cranks and cog-wheels 21 engaged by pinions 22 on the driving shaft, movement being transmitted to said shaft by a flexible connection or in other suitable way.

In order to limit the pressure of the plate 11 and the roller 12 on the teat, so as not to hurt the latter, a ring 24 is screwed on the arm 5 so as to move in the longitudinal direction thereof, when turned. Attached to the rod 13 is a pin or the like projecting through one or two slots 25 in the arm 5 so as to strike the ring 24 in a certain position of the rod 13 and thereby prevent the plate 11 from exerting a harder pressure on the teat than admitted by the ring 24 in its adjusted position.

Placed on the interior part 16 of each connecting-rod is a series of ratchet teeth 26 coöperating with a pawl 28 pressed inwardly by a spiral spring. The pawl may be disengaged by hand and is so arranged as to be able to slide over the ratchet teeth when the part 17 of the connecting-rod is moved by its crank toward the right of Fig. 2, whereas it engages the teeth ultimately passed when the part 17 moves in the opposite direction. By this means an automatic adjustment of the length of the connecting-rod is effected during the first revolution of the cog-wheel 21 so that the length of the connecting-rod will always correspond to the adjustment of the slide 3.

The machine is attached to the cow by means of a plate 29 of a suitable form which is hung by girts under the belly of the cow. The plate 29 is provided with broad, suitably springy pawls 31 adapted to enter into corresponding slots 32 in the box so that the latter need only be pushed over the pawls in order to attach the machine to the plate 29 and thereby to the cow.

The machine works as follows: When the machine has been attached to the cow, the slides 3 are first adjusted so that the teat cups are just beneath their corresponding teats which are thereupon introduced into the teat cups. Thereupon the rings 24 are adjusted corresponding to the thickness of the teats, whereupon the machine is ready to work. During the first revolution of the cranks the connecting-rods obtain the correct length and the milking thereupon continues as long as there is milk to be drawn from the udder. When a particular teat has been milked, the corresponding milking organ may be brought out of action by the corresponding ratchet pawl 28 being disconnected so that the connecting-rod cannot transmit motion to its milking organ.

It is obvious that all the milking devices need not have their connecting rods self-adjustable in length, since it is always possible to so attach the milking machine to the cow that one pair of teat cups, for instance the two fore ones, are just beneath the corresponding teats, without any adjustment being required, the other (rear) teat cups being thereupon adjusted in position by correspondingly adjusting the slides placed at the rear ends of the box, whereby the corresponding connecting rods will automatically adjust their lengths during the first revolution of the cranks. Adjustable connections, such as slides and adjustable connecting rods are therefore needed only for one pair of teat cups.

In Figs. 4 and 5, I have shown a part of a milking machine corresponding to the part shown in Fig. 2 but in which the slide and the means for automatically adjusting the length of the connecting rod are dispensed with. The milking machine shown in Figs. 4 and 5 also in some other respects differs slightly from the embodiment of the machine hereinbefore described.

The tube 33 carrying the teat-cup 34 and inclosing the connection 35, 36 between the teat-operating member 37 and the connecting rod 38, 39 is shown provided at its fore end with a ball 40 lying in a stationary socket at the rear end of the box 41. The two-part connection 35, 36 is substantially the same as in the machine hereinbefore described. Also the connecting rod is made in two parts 38, 39 which are locked in position by a pawl 42 movable in a casing 43 attached to the part 39 and adapted to engage a corresponding recess 44 in the part 38. When the teat has been milked, the pawl 42 may be brought out of engagement with the rod 38 by pulling down the handle 45 against the action of the spring 46.

It may sometimes be desirable to cause the teat cups to move slightly up and down, particularly at the end of the milking operation when the udder is nearly emptied. This may be performed by a double-armed lever 47 adapted to swing about a fulcrum 48 in the box 41. Attached to the rear end of the lever 47 is a ring 49 bearing at its upper part on the tube 33 so as to cause the said tube to partake in the movement of the lever 47. Placed at the fore end of the said lever is a roller 50 bearing on the edge of a cam 51 attached to an axle 52 mounted in the box 41. Placed on the axle 52, and preferably running loosely thereon, is a sprocket-wheel 53 to which motion is imparted by a chain 54 running over a sprocket wheel 55 on one of the crank shafts. Obviously there are four cams on the axle 52, each operating one lever connected to the corresponding teat cup. Placed at one side of the wheel 53 is the one part of a friction clutch adapted to be brought into engagement with another part of the friction clutch attached to the axle 52. The connection and disconnection of the two parts of the friction clutch may be performed by a fork 56 having a handle 57 by which the wheel 53 or the axle 52 may be moved longitudinally in one or the other direction. It will thus be possible to throw the mechanism for lowering and raising the teat cups into action at the end of the milking operation so as to cause the teat cups to slightly clasp the udder and thereby facilitate the drawing off of the remainder of milk. The cams are preferably so placed on the axle 52 that, when the teat-operating member 37 is in the position in which the teat is most strongly compressed, the cam 51 takes up the position shown in Fig. 5 in which the teat cup is caused to take up its lowest position.

The springs 58 tending to hold the teat cups up against the udder may be fastened at their rear ends to a tensioning device of any suitable construction. In the embodiment illustrated the tensioning device consists of a lever 59 pivoted at a point 60 above the tube 33 and having preferably in level with the axis of the tube an eye 61 to which the spring 58 may be attached, said lever having at its lower end a spring-pressed pawl 62 engaging a ratchet segment 63 at the lower side of the tube 33. The pawl 62 may be attached by pins or the like to an outer sleeve 64 by which the pawl may be thrown out of engagement with the teeth of the ratchet-segment when the tension of the spring 58 is to be adjusted.

The teat cup 34 is shown inserted into a cross-head 65 attached to the tube 33 and provided at its lower end with a hinged screw 66 having a head 67 for securing the cup in position. The teat cups may advantageously be made of celluloid in order to be as light as possible. Also the arms carrying the teat cups are made of light material so that they have but little inertia and easily partake in the movements of the udder, or the cow.

I claim:

1. In a milking machine, the combination of a box adapted to be rigidly attached to the cow, at a distance from the udder, arms attached to the said box in such a manner as to be able to swing in all directions, teat cups carried by the said arms, milking organs placed in the said teat cups, means placed in the box for operating the said milking organs, and springs adapted to keep the teat cups yieldingly pressed against the udder, substantially as and for the purpose set forth.

2. In a milking machine, the combination of a box adapted to be rigidly attached to the cow, at a distance from the udder, arms attached to the said box in such a manner as to be able to swing in all directions, teat cups carried by the said arms, milking organs placed in the said teat cups, means placed in the box for operating the said milking organs, springs adapted to keep the teat cups yieldingly pressed against the udder, and means for regulating the tension of the said springs, substantially as and for the purpose set forth.

3. In a milking machine, the combination of a box adapted to be rigidly attached to the cow, arms attached to the said box in such a manner as to be able to swing in all directions, teat cups carried by the said arms, milking organs placed in the said teat cups, means placed in the box for operating the said milking organs, springs adapted to keep the teat cups yieldingly pressed against the udder, and means for imparting to the arms carrying the teat cups an up- and downward swinging movement causing the teat cups to softly clap the udder, substantially as and for the purpose set forth.

4. In a milking machine, the combination of a box adapted to be rigidly attached to the cow, arms attached to the said box in such a manner as to be able to swing in all directions, teat cups carried by the said arms, milking organs placed in the said teat cups, means placed in the box for operating the said milking organs, springs adapted to keep the teat cups yieldingly pressed against the udder, means for imparting to the arms carrying the teat cups an up- and downward swinging movement, and means for throwing the said latter means into and out of operation, substantially as and for the purpose set forth.

5. In a milking machine, the combination of a box adapted to be rigidly attached to the cow, at a distance from the udder, arms attached by ball-joints to the said box, teat cups carried by the said arms, milking organs placed in the said teat cups, means placed in the box for operating the said milking organs, and springs adapted to keep the teat cups yieldingly pressed against the udder, substantially as and for the purpose set forth.

6. In a milking machine, the combination of a box adapted to be rigidly attached to the cow, arms adjustably connected to the said box in such a manner as to be able to swing in all directions, teat cups carried by the said arms, milking organs placed in the said teat cups, means placed in the box for operating the said milking organs, connections between the said operating means and the milking organs, and springs adapted to keep the teat cups yieldingly pressed against the udder, substantially as and for the purpose set forth.

7. In a milking machine, the combination of a box adapted to be rigidly attached to the cow, cylinders formed in the said box, slides adjustably mounted in the said cylinders, arms journaled in sockets in the said slides, teat cups carried by the said arms, milking organs placed in the said teat cups, means placed in the box for operating the said milking organs, and springs attached to the said arms and to the slides for keeping the arms yieldingly pressed against the udder, substantially as and for the purpose set forth.

8. In a milking machine, the combination of a box adapted to be rigidly attached to the cow, at a distance from the udder, hollow arms attached to the said box in such a manner as to be able to swing in all directions, teat cups carried by the said arms, milking organs placed in the said teat cups, means placed in the box for operating the said milking organs, connections between the said operating means and the milking organs extending through the hollow arms, and springs adapted to keep the teat cups yieldingly pressed against the udder, substantially as and for the purpose set forth.

9. In a milking machine, the combination of a box adapted to be rigidly attached to the cow, arms attached to the said box in such a manner as to be able to swing in all directions, teat cups carried by the said arms, milking organs placed in the said teat cups, means placed in the box for operating the said milking organs, compressible connections between the said operating means and the milking organs, and springs adapted to keep the teat cups yieldingly pressed against the udder, substantially as and for the purpose set forth.

10. In a milking machine, the combination of a box adapted to be rigidly attached to the cow at a distance from the udder, arms attached to the said box in such a manner as to be able to swing in all directions, teat cups carried at the ends of the said arms, milking organs placed in the said teat cups, means placed in the box for operating the said milking organs, connections between the said operating means and the milking organs, means for preventing the milking organs from pressing too strongly on the teats, and springs adapted to keep the teat cups yieldingly pressed against the udder, substantially as and for the purpose set forth.

11. In a milking machine, the combination of a box adapted to be rigidly attached to the cow, arms attached to the said box in such a manner as to be able to swing in all directions, teat cups carried by the said arms, milking organs comprising a plate and a roller yieldingly mounted at the top of the said plate, means placed in the box for operating the said milking organs, connections between the said operating means and the milking organs, and springs adapted to keep the teat cups yieldingly pressed against the udder, substantially as and for the purpose set forth.

12. In a milking machine, the combination of a box adapted to be rigidly attached to the cow, arms adjustably connected to the said box in such a manner as to be able to swing in all directions, teat cups carried by the said arms, milking organs placed in the said teat cups, adjustable means placed in the box for operating the said milking organs, connections between the said operating means and the milking organs, means for automatically adjusting the said operating means, and springs adapted to keep the teat cups yieldingly pressed against the udder, substantially as and for the purpose set forth.

13. In a milking machine, the combination of a box adapted to be rigidly attached to the cow, arms adjustably connected to the said box in such a manner as to be able to swing in all directions, teat cups carried by the said arms, milking organs placed in the said teat cups, means comprising a crank and a connecting-rod placed in the box for operating the milking organs of a teat cup, a connection between the connecting-rod and the milking organ, means for automatically adjusting the length of the connecting-rod, and springs adapted to keep the teat cups yieldingly pressed against the udder, substantially as and for the purpose set forth.

14. In a milking machine, the combination of a box adapted to be rigidly attached to the cow, arms adjustably connected to the said box in such a manner as to be able to swing in all directions, teat cups carried by the said arms, milking organs placed in the said teat cups, a revoluble crank shaft mounted in the said box, a telescopic connecting-rod driven by the said crank-shaft, ratchet teeth on one part of the said connecting-rod, a ratchet pawl at the other part thereof adapted to engage one of the said ratchet teeth, a connection between the said connecting-rod and the corresponding milking organ, and springs adapted to keep the teat cups yieldingly pressed against the udder, substantially as and for the purpose set forth.

15. In a milking machine, the combination of a girth adapted to be applied to the cow, pawls attached to the said girth, a box having slots adapted to be engaged by the said pawls, arms connected to the said box in such a manner as to be able to swing in all directions, teat cups carried by the said arms, milking organs placed in the said teat cups. means placed in the box for operating the said milking organs, and springs adapted to keep the teat cups yieldingly pressed against the udder, substantially as and for the purpose set forth.

GUSTAF EMIL JONSSON.

Witnesses:
 AUG. SÖRENSEN,
 KARL RUNCSKOG.